United States Patent
De Clercq et al.

(10) Patent No.: US 7,166,971 B2
(45) Date of Patent: Jan. 23, 2007

(54) CIRCUIT ARRANGEMENT FOR OPERATING A HIGH PRESSURE DISCHARGE LAMP

(75) Inventors: John Evarist Karel Georges De Clercq, Oordegem (BE); Hans Antonie Feijen, Oss (NL); Roy Hendrik Anna Maria Van Zundert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 67 days.

(21) Appl. No.: 10/534,317

(22) PCT Filed: Nov. 6, 2003

(86) PCT No.: PCT/IB03/05013

§ 371 (c)(1),
(2), (4) Date: May 9, 2005

(87) PCT Pub. No.: WO2004/045256

PCT Pub. Date: May 27, 2004

(65) Prior Publication Data

US 2006/0108951 A1    May 25, 2006

(30) Foreign Application Priority Data

Nov. 11, 2002   (EP)   .................. 02079686
May 1, 2003    (EP)   .................. 03101203

(51) Int. Cl.
*G05F 1/00*   (2006.01)
(52) U.S. Cl. ..................... 315/307; 315/360
(58) Field of Classification Search ........ 315/307–308, 315/224, 226, 209 R, 291, 360
See application file for complete search history.

(56) References Cited

U.S. PATENT DOCUMENTS

| 2003/0102818 | A1* | 6/2003 | Shen ..................... 315/291 |
| 2003/0151377 | A1* | 8/2003 | Slegers .................. 315/291 |
| 2004/0183460 | A1* | 9/2004 | Van Casteren .......... 315/209 R |
| 2004/0257001 | A1* | 12/2004 | Langeslag et al. ...... 315/209 R |
| 2005/0035729 | A1* | 2/2005 | Lev et al. ............... 315/291 |

* cited by examiner

*Primary Examiner*—Thuy V. Tran
*Assistant Examiner*—Tung Le

(57) ABSTRACT

A circuit arrangement for operating a high pressure discharge lamp comprises a down converter equipped with an output capacitor and a commutator equipped with an ignition choke. The amplitude of the DC current generated by the down converter is controlled by means of a control circuit. To suppress resonance of the ignition choke with the output capacitor caused by commutation of the DC current, the current reference signal of the current control is adjusted in dependency of the power consumed by the lamp and in dependency of the lamp voltage immediately before and after each commutation.

6 Claims, 2 Drawing Sheets

CIRCUIT ARRANGEMENT FOR OPERATING A HIGH PRESSURE DISCHARGE LAMP

Figure 1:
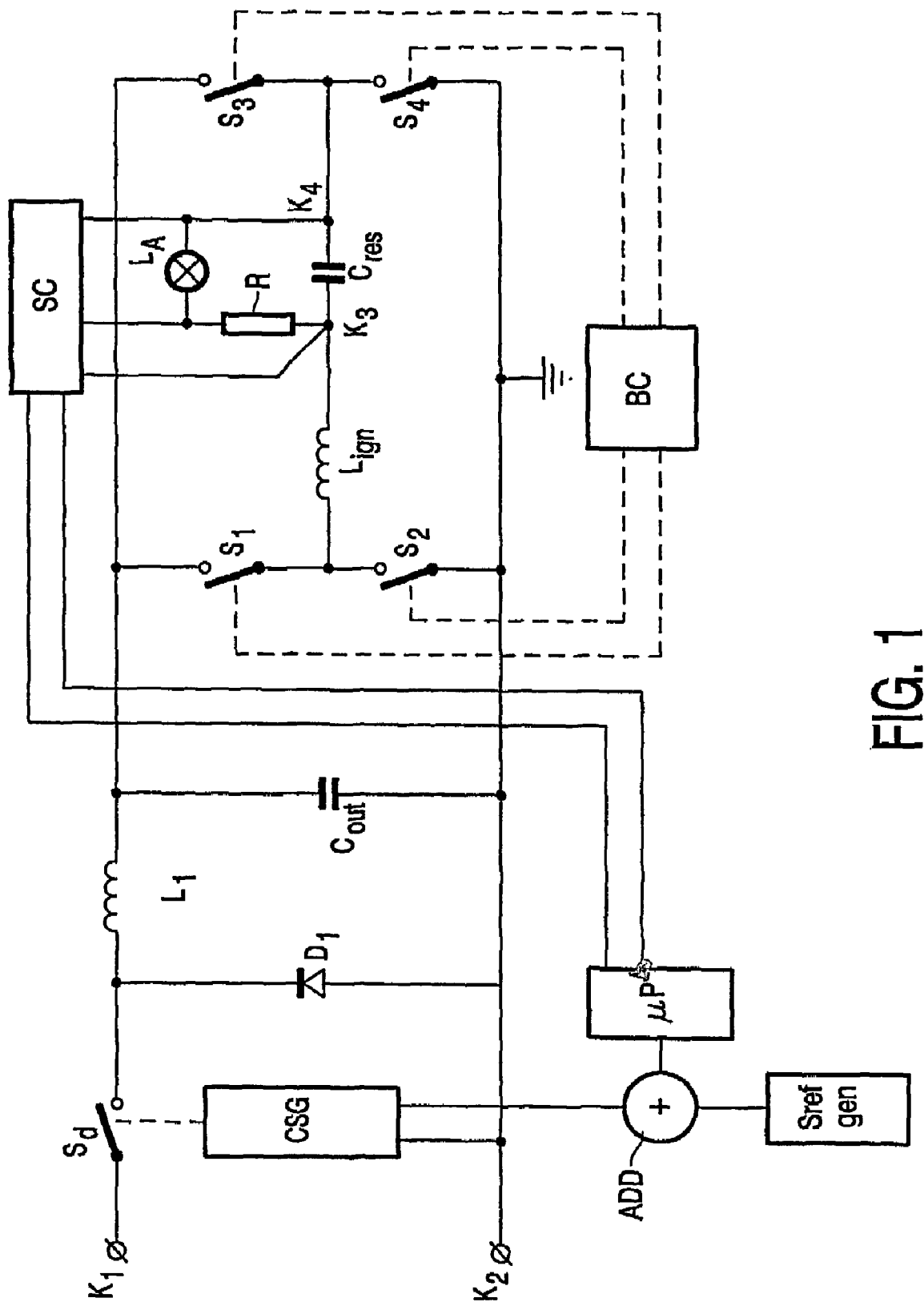

The invention relates to a circuit arrangement for operating a high pressure discharge lamp comprising
input terminals for connection to a supply voltage source,
a DC-DC-converter coupled to the input terminals for generating a DC current out of a supply voltage supplied by the supply voltage source and comprising
a control circuit for controlling the DC current at a value that is represented by a reference signal Sref,
a reference circuit for generating the reference signal Sref, and an output capacitor,
a commutator for commutating the polarity of the DC current and comprising lamp connection terminals and an ignition inductor,
a first circuit part for modulating the reference signal Sref at a modulation frequency that equals the frequency of the commutation of the DC current by subsequently
decreasing the reference signal Sref by an amount $\Delta$Sref during a first time interval $\Delta$t1 that starts a second time interval $\Delta$t2 before each commutation of the DC current,
maintaining the reference signal at the decreased value during a third time interval $\Delta$t3,
increasing the reference signal Sref by an amount $\Delta$Sref during a fourth time interval $\Delta$t4.

Such a circuit arrangement is known and is for instance often used to operate ultra high pressure lamps in projection equipment. In practice the frequency of commutation is in the order of magnitude of 10 Hz. Between two subsequent commutations the DC current is controlled at a constant value represented by the reference value Sref for most of the time. As a consequence the current through the high pressure discharge lamp is a low frequency substantially square wave shaped AC current. It has been found that the high pressure discharge lamp can be operated in a very efficient way by means of such a current. A problem associated with the circuit arrangement is that a commutation of the polarity of the DC current effects a substantially stepwise change in the load of the circuit arrangement. This stepwise change in the load of the circuit arrangement causes the DC-DC-converter output capacitor to resonate with the ignition inductor. This resonance in turn often causes audible noise and influences the light output of the lamp. Furthermore this resonance can shorten the life time of the lamp. In practise this resonance is often counteracted by temporarily decreasing the value of Sref in the direct vicinity of a commutation. This decrease in Sref is often referred to as the "dip" and causes the DC-current to temporarily have a comparatively low value during a small time lapse in which commutation takes place. As a result the resonance caused by the stepwise load change is suppressed to a large extent. The "dip" can be considered as a modulation of the reference signal Sref that is taking place with the same frequency as the commutation of the DC-current. The "dip" is characterized by dip parameters such as $\Delta$Sref (the depth of the dip), the time lapse during which Sref is maintained at the decreased level, the rate at which Sref is decreased at the beginning of the dip, the rate at which Sref is increased at the the end of the dip and the phase relation between the modulated signal Sref and the the lamp current. In the known circuit arrangement the setting of the dip parameters is optimized for a new lamp (a lamp having that has only a small number of burning hours) and for a power consumption by the lamp that equals the nominal lamp power. However, many modern circuit arrangements comprise means for adjusting the lamp power. Similarly, when the number of burning hours of the lamp increases, the lamp voltage changes. It has been found in practise that a different amount of power consumed by the lamp requires a different setting of the dip parameters in order to obtain a maximal suppression of the resonance. The same is true for a different lamp voltage. As a consequence the resonance suppression implemented in the known circuit arrangements is only optimized for one particular lamp power level and for one value of the lamp voltage.

The invention aims to provide a circuit arrangement for operating a high pressure discharge lamp in which an effective suppression of the resonance between the output capacitor of the DC-DC-converter and the ignition inductor is realized for many different levels of the power consumed by the lamp and/or many different values of the lamp voltage.

A circuit arrangement as mentioned in the opening paragraph is therefore according to the invention characterized in that the circuit arrangement further comprises
a second circuit part for adjusting at least one parameter chosen from the group formed by $\Delta$Sref, $\Delta$t1, $\Delta$t2, $\Delta$t3 and $\Delta$t4 in dependency of a parameter chosen from the group formed by the power consumed by the lamp, the lamp voltage and the lamp current.

In a circuit arrangement according to the invention the setting of at least part of the dip parameters is controlled in dependency of the power consumed by the lamp and/or the lamp voltage and/or the lamp current. It is observed that a change in the lamp current corresponds to a change in lamp power. Therefore adjusting one or more dip parameters in dependency of the lamp current is in fact equivalent to adjusting one or more dip parameters in dependency of the lamp power. As a result the dip parameters in a circuit arrangement according to the invention are automatically optimized in response to a change in the power consumed by the lamp and/or a change in the lamp voltage. As a result the amplitude of the AC voltage that is present over the output capacitor of the DC-DC-converter and that is caused by a resonance between the output capacitor of the DC-DC-converter and the ignition inductor is effectively suppressed for a range of values of the power consumed by the lamp and/or the lamp voltage.

Good results have been obtained for embodiments of a circuit arrangement according to the invention, wherein the second circuit part comprises a memory in which one or more tables are stored, each of the tables comprising a range of lamp power levels and for each value of the lamp power level in the range a corresponding value for one or more of the parameters $\Delta$t3 and $\Delta$t4. Preferably, each of the tables comprises data for a predetermined range of the lamp voltage. In this way it is realized by comparatively simple means that the "dip" is optimized for many different values of the power consumed by the lamp and for many different values of the lamp voltage.

Alternatively, the second circuit part may comprise a memory in which a one or more tables are stored comprising a range of lamp voltage values and for each value of the lamp voltage in the range a corresponding value for one or more of the parameters $\Delta$Sref, $\Delta$t1, $\Delta$t2, $\Delta$t3 and $\Delta$t4. Preferably, each of the tables comprises data for a predetermined range of the lamp power. Also by this latter content of the tables, it is realized by comparatively simple means that the "dip" is optimized for many different values of the power consumed by the lamp and for many different values of the lamp voltage.

Preferably the second circuit comprises a microcontroller.

Figure 2:
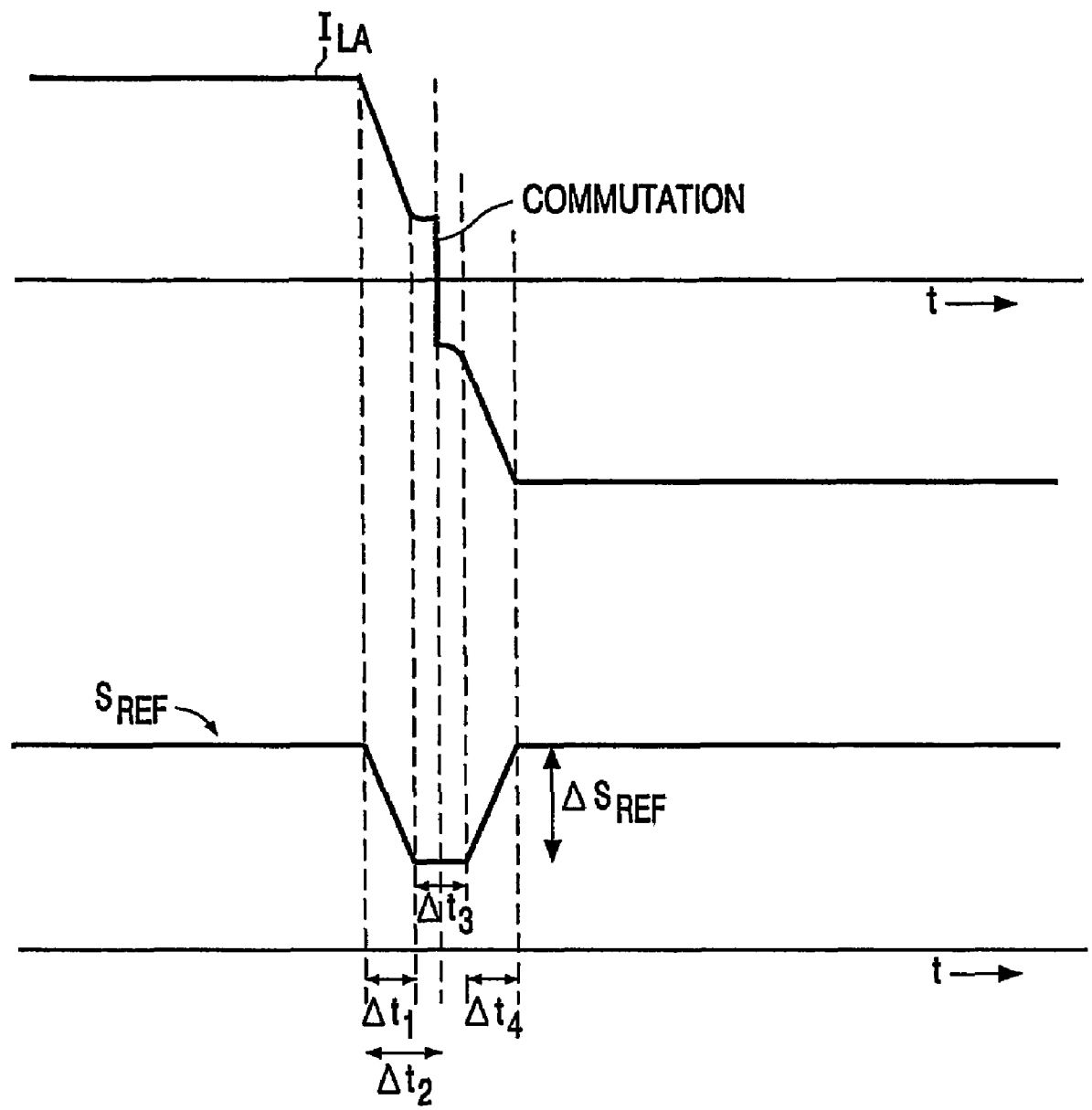

An embodiment of a circuit arrangement according to the invention will be explained making reference to a drawing. In the drawing FIG. 1 shows an embodiment of a circuit arrangement according to the invention, with a lamp connected to it;

FIG. 2 shows the shape of the modulated signal Sref and the current through the lamp in the embodiment shown in FIG. 1 as a function of time.

In FIG. 1, K1 and K2 are input terminals for connection to a supply voltage source. Input terminals K1 and K2 are connected by means of a series arrangement of a switching element Sd, an inductive element L1 ad an output capacitor Cout. Input terminal K2 is connected to a common terminal of switching element Sd and inductor L1 by means of a diode D1. CSG is a circuit part for generating a control signal for alternately rendering switching element Sd conductive and non-conductive. An output terminal of circuit part CSG is coupled to a control electrode of switching element Sd. A first input terminal of circuit part CSG is coupled to input terminal K2. A second input terminal of circuit part CSG is connected to an output terminal of circuit part ADD. Circuit part ADD is a circuit part for generating at its output terminal a signal that is the sum of a first signal present at a first input terminal of circuit part ADD and a second signal present at a second input terminal of circuit part ADD. The first input terminal of circuit part ADD is connected to an output terminal of circuit part Srefgen. Circuit part Srefgen is a reference circuit for generating a reference signal Sref. Switching element Sd, circuit part CSG, inductive element L1, output capacitor Cout, diode D1 and circuit part Srefgen together form a DC-DC-converter for generating a DC current out of a supply voltage supplied by the supply voltage source. In the embodiment shown in FIG. 1 this DC-DC-converter is of the down-converter type. Circuit part Srefgen together with circuit part CSG forms a control circuit for controlling the DC-current at a value that is represented by a reference signal Sref. Signal Sref represents a desired value of the DC current generated by the down-converter during during the major part of each half period of the lamp current. Output capacitor Cout is shunted by a series arrangement of swiching element S1 and switching element S2 and also by a series arrangement of switching element S3 and switching element S4. A common terminal of switching element S1 and switching element S2 is connected to a common terminal of switching element S3 and switching element S4 by means of a series arrangement of ignition inductor Lign and capacitor Cres. Capacitor Cres is shunted by a series arrangement of an ultra high pressure discharge lamp LA and a current sense resistor R, connected to lamp connection terminals K3 and K4 situated at respective sides of capacitor Cres. Control electrodes of the switching elements S1–S4 are coupled to respective output terminals of a circuit part BC for generating control signals for controlling the conductive state of switching elements S1–S4. In FIG. 1 this coupling is indicated by means of dotted lines. Switching elements S1–S4, circuit part BC, ignition inductor Lign, lamp terminals K3 and K4 and capacitor Cres together form a commutator for commutating the polarity of the DC current generated by the DC-DC-converter. Circuit part SC is a circuit part for measuring the lamp power and the lamp voltage. Lamp connection terminals K3 and K4 are connected to respective input terminals of circuit part SC. A common terminal of the lamp LA and current sense resistor R is connected to a further input terminal of circuit part SC. A first output terminal of circuit part SC is connected to a first input terminal of microcontroller µP. A second output terminal of circuit part SC is connected to a second input terminal of microcontroller µP. An output terminal of microcontroller µP is connected to a second input terminal of the circuit part ADD. Circuit part ADD and the microcontroller µP together form a first circuit for modulating the reference signal Sref at a modulation frequency that equals the frequency of the commutation of the DC current by subsequently decreasing the reference signal Sref by an amount ΔSref during a first time interval Δt1 that starts a second time interval Δt2 before each commutation of the DC current, maintaining the reference signal at the decreased value during a third time interval Δt3, increasing the reference signal Sref by an amount ΔSref during a fourth time interval Δt4.

The circuit part SC together with the microcontroller µP together form a second circuit part for adjusting at least one parameter chosen from the group formed by ΔSref, Δt1, Δt2, Δt3 and Δt4 in dependency of a parameter chosen from the group formed by the power consumed by the lamp and the lamp voltage. In fact in the embodiment shown in FIG. 1 the second circuit part adjusts the dip both in case of a change in the power consumed by the lamp as well as in case of a change in lamp voltage. The microprocessor µP comprises a memory in wich a number of tables are stored. Each table comprises a number of values for the lamp voltage and for each value of the lamp voltage a corresponding value for each the parameters ΔSref, Δt1, Δt2, Δt3 and Δt4. Each of the tables comprises data for a (small) range of values of the power consumed by the lamp.

The operation of the circuit arrangement shown in FIG. 1 is as follows.

When the input terminals K1 and K2 are connected to a supply voltage source that in case of the embodiment shown in FIG. 1 supplies a DC supply voltage, the circuit part CSG generates a control signal that renders the switching element Sd alternately conductive and non-conductive at a high frequency, for instance 35 KHz. As a result a DC voltage with a lower amplitude than the DC supply voltage is present over the output capacitor Cout, while a DC current is supplied to the commutator. The circuit part BC controls the switches S1–S4 alternately in two different states. In the first state the switching elements S1 and S4 are conductive and the switching elements S2 and S3 are non-conductive. In the second state the switching elements S2 and S3 are conductive and the switching elements S1 and S4 are non-conductive.

When the lamp has not yet ignited, the frequency at which the circuit part BC changes the state of the switches S1–S4 is comparatively high, so that the ignition inductor resonates with the capacitor Cres. As a result a comparatively high voltage is present across capacitor Cres that ignites the lamp. After ignition of the lamp the frequency at which the circuit part BC changes the state of the switches S1–S4 is comparatively low, for instance 90 Hz. As a result the lamp current is a low frequency substantially square wave shaped AC current. For a very short time lapse between the two states all the switching elements are maintained in the non-conductive state to prevent the switching elements that are part of the same series arrangement to become conductive at the same time thereby forming a short circuit. During this very short time lapse the load of the DC-DC-converter is zero. Before and after this very short time lapse the load of the DC-DC-converter differs from zero. The abrupt change in the load taking place during commutation causes the output capacitor Cout and the ignition inductor to resonate. Between commutations, when there is no resonance between the output capacitor Cout and the ignition inductor Lign the signal at the second input terminal of circuit part ADD is approximately equal to zero. The signal present at the output terminal of circuit part ADD and also at the first input terminal of circuit part CSG therefore equals Sref. The voltage over ohmic resistor R represents the actual value of the DC current generated by the DC-DC-converter (=the lamp current) and the circuit part CSG controls the switching element Sd in such a way that this current is maintained at a level that corresponds to Sref. In the vicinity of a commutation the signal Sref is modulated by means of a dip that is characterized by the parameters ΔSref, Δt1, Δt2, Δt3 and Δt4. As a consequence the current through the lamp is decreased in the vicinity of the commutation so that the resonance between output capacitor Cout and ignition inductor Lign is suppressed.

The circuit part SC monitors the lamp voltage and the current through current sense resistor R and generates at its first output terminal a signal representing the lamp power and at its second output terminal a signal that represents lamp voltage.

At this stage it is remarked that in order to generate a signal representing lamp power and/or a signal representing lamp voltage it is not necessary to measure directly at the la,mp as is done in the embodiment in FIG. 1. In fact many other possibilities exist to generate a signal representing lamp power and/or a signal representing lamp voltage by measuring another voltage and/or another current elsewhere in the circuit arrangement.

The microcontroller periodically repeats the following actions. Based on the actual lamp power, it chooses the proper table in the memory. In the proper table the microprocessor selects the values of the parameters ΔSref, Δt1, Δt2, Δt3 and Δt4 that are associated with the stored value of the lamp voltage that is closest to the actual value of the lamp voltage measured by circuit part SC. These values of the parameters ΔSref, Δt1, Δt2, Δt3 and Δt4 are subsequently used in the modulation of the signal Sref. As a consequence, the shape and position of the dip are always optimized for the actual lamp voltage and the actual value of the power consumed by the lamp.

The shape of the modulated reference signal is shown in FIG. 3. It can be seen that the value of Sref is constant most of the time but the modulation effects a periodical temporary decrease of the reference signal Sref. These periodical decreases start at a time interval Δt2 before commutation and have a shape that is determined by the parameters ΔSref, Δt1, Δt3 and Δt4. FIG. 3 also shows the shape of the lamp current as a function of time. The lamp current has a constant amplitude most of the time. A time lapse Δt2 before each commutation the amplitude decreases during the time interval Δt1. The amplitude of the lamp current is then maintained at a constant value during the time interval Δt3. In the course of the time interval Δt3 the commutation of the DC current is taking place. After the time interval Δt3 the amplitude of the lamp current increases back to its original value during the time interval Δt4. It is noteworthy that Δt1 is not necessarily equal to Δt4 and that commutation does not necessarily take place when half of the time interval Δt3 has lapsed but may take place at any other time in the time interval Δt3 depending on for instance the value of Δt2.

Merely by way of example the functioning of the circuit arrangement shown in FIG. 1 was described for an embodiment in which all of the parameters ΔSref, Δt1, Δt2, Δt3 and Δt4 are adjusted. Of course it is possible to let the microprocessor adjust less parameters. Adjustment of more parameters will generally lead to a better suppression of the resonance between the output capacitor and the ignition inductor.

It be mentioned that the invention is very suitable for implementation in a circuit arrangement for operating a high pressure discharge lamp that is equipped with a circuit part for increasing the amplitude of the lamp current during a short time interval at the end of each half period of the lamp current. It has been found that such a temporary increase of the amplitude of the lamp current decreases flatter. In such circuit arrangements the decrease in lamp current caused by the dip only starts after the short time interval during which the lamp current is increased.

The invention claimed is:

1. Circuit arrangement for operating a high pressure discharge lamp comprising
   input terminals for connection to a supply voltage source,
   a DC-DC-converter coupled to the input terminals for generating a DC current out of a supply voltage supplied by the supply voltage source and comprising
     a control circuit for controlling the DC current at a value that is represented by a reference signal Sref,
     a reference circuit for generating the reference signal Sref, and an output capacitor,
   a commutator for commutating the polarity of the DC current and
   comprising lamp connection terminals and an ignition inductor,
   a first circuit part for modulating the reference signal Sref at a modulation frequency that equals the frequency of the commutation of the DC current by subsequently
     decreasing the reference signal Sref by an amount ΔSref during a first time interval Δt1 that starts a second time interval Δt2 before each commutation of the DC current,
     maintaining the reference signal at the decreased value during a third time interval Δt3,
     increasing the reference signal Sref by an amount ΔSref during a fourth time interval Δt4,
   characterized in that the circuit arrangement further comprises
     a second circuit part for adjusting at least one parameter chosen from the group formed by ΔSref, Δt1, Δt2, Δt3 and Δt4 in dependency of a parameter chosen from the group formed by the power consumed by the lamp, the lamp voltage and the lamp current.

2. Circuit arrangement according to claim 1, wherein the second circuit part comprises a memory in which one or more tables are stored, each of the tables comprising a range of lamp power levels and for each value of the lamp power level in the range a corresponding value for one or more of the parameters ΔSref, Δt1, Δt2, Δt3 and Δt4.

3. Circuit arrangement according to claim 2, wherein each of the tables comprises data for a predetermined range of the lamp voltage.

4. Circuit arrangement according to claim 1, wherein the second circuit part comprises a memory in which a one or more tables are stored comprising a range of lamp voltage values and for each value of the lamp voltage in the range a corresponding value for one or more of the parameters ΔSref, Δt1, Δt2, Δt3 and Δt4.

5. Circuit arrangement according to claim 4, wherein each of the tables comprises data for a predetermined range of the lamp power.

6. Circuit arrangement according to claim 1, wherein the second circuit part comprises a microcontroller.

* * * * *